United States Patent [19]

Miyamoto et al.

[11] Patent Number: 5,765,047
[45] Date of Patent: Jun. 9, 1998

[54] LENS SHUTTER CAMERA HAVING A ZOOM VIEWFINDER MECHANISM AND AN ADJUSTABLE STROBE LIGHT GENERATING UNIT

[75] Inventors: Hidenori Miyamoto, Urayasu; Isao Soshi, Tokyo; Minoru Kato; Junichi Omi, both of Kawasaki, all of Japan

[73] Assignee: Nikon Corporation, Tokyo, Japan

[21] Appl. No.: 899,152

[22] Filed: Jul. 23, 1997

Related U.S. Application Data

[63] Continuation of Ser. No. 431,038, Apr. 28, 1995, abandoned, which is a continuation-in-part of Ser. No. 354,912, Dec. 13, 1994, abandoned.

[30] Foreign Application Priority Data

Dec. 13, 1993 [JP] Japan .................... 5-341990
Apr. 28, 1994 [JP] Japan .................... 6-092658

[51] Int. Cl.[6] ................... G03B 15/03; G03B 3/00
[52] U.S. Cl. ................... 396/62; 396/149; 396/199; 396/377; 396/383
[58] Field of Search ................... 396/62, 61, 377, 396/149, 199, 373, 378, 379, 383, 175

[56] References Cited

U.S. PATENT DOCUMENTS

| | | | |
|---|---|---|---|
| 4,768,048 | 8/1988 | Wakabayashi | 354/195.12 |
| 4,945,372 | 7/1990 | Higuchi et al. | 354/199 |
| 4,965,615 | 10/1990 | Fujita et al. | 354/145.1 |
| 5,036,346 | 7/1991 | Hatamori et al. | 354/195.12 |
| 5,280,315 | 1/1994 | Nomura et al. | 354/149.11 |
| 5,321,454 | 6/1994 | Mogamiya | 354/195.12 |
| 5,335,030 | 8/1994 | Suzuka | 354/149.1 |
| 5,337,109 | 8/1994 | Ogawa | 354/222 |
| 5,345,285 | 9/1994 | Hasushita et al. | 354/159 |
| 5,424,796 | 6/1995 | Kondoh | 354/403 |
| 5,438,381 | 8/1995 | Mogamiya et al. | 354/199 |

OTHER PUBLICATIONS

U.S. application No. 08/354,912, Miyamoto et al., filed Dec. 13, 1994.

Primary Examiner—David M. Gray
Assistant Examiner—Nicholas J. Tuccillo

[57] ABSTRACT

A lens camera having a viewfinder mechanism and an adjustable strobe light generating unit, wherein the zoom viewfinder mechanism has a disk cam to cause a lens group of a viewfinder optical system to move back and forth in an optical axis direction according to a difference of the distances in the radial direction from the rotation center of shafts of individual lenses of the lens group, the shafts fitting in grooves of the disk and driving the individual lenses of the lens group in order to perform variable power of a zoom viewfinder. Drive gears drive the disk cam and one of the drive gears is a helical gear which has a predetermined angle for a lead angle, the rotation center of the disk cam and the rotation axis direction of the one drive gear being positioned so as to intersect. The strobe light generating unit is moved in the direction of the optical axis of the camera so that a radiating angle of a strobe fitted in the strobe light generating unit is changed according to the variable power of operation of the lens. Jaw portions are integrally formed on the strobe light generating unit and engage rail grooves formed on the body of the camera.

16 Claims, 7 Drawing Sheets

LENS SHUTTER CAMERA HAVING A ZOOM VIEWFINDER MECHANISM AND AN ADJUSTABLE STROBE LIGHT GENERATING UNIT

CROSS-REFERENCE TO RELATED APPLICATION

This application is a continuation of application Ser. No. 08/431,038, filed Apr. 28, 1995, now abandoned, which is a continuation-in-part of application Ser. No. 08/354,912, filed Dec. 13, 1994, now abandoned.

BACKGROUND OF THE INVENTION

1. Field of the Invention

The present invention relates to a lens shutter camera having a zoom viewfinder mechanism and an adjustable strobe light generating unit, and, more particularly, to a zoom viewfinder mechanism which is optimum in a lens shutter camera and a strobe radiation angle change device which is coupled to a zoom lens of the camera, for changing the angle of radiation of a strobe based upon the zoom operation of the zoom lens.

2. Description of the Related Art

FIG. 1 shows a conventional strobe radiation angle change device for changing the radiation angle of a strobe accompanying a variable power operation of a zoom photographic lens. A drive tube 1 drives a zoom photographic lens optical system (not shown in the drawing) into a tele end (telephoto side) state, a wide end (wide angle side) state, or a collapsed state (non-photographing state). A gear 1a is formed on the external circumference of the drive tube 1. The gear 1a is provided with a rotational force from a motor 11 via a gear train 12 to drive the drive tube 1. Further, this rotation force is transmitted via drive gears 15 and 14 to a drive gear 2d of a disk cam 2 which performs variable power of a viewfinder mechanism 16 and strobe mechanism 17. Namely, the rotation force of the drive tube 1 is used to cause the variable power performance of the viewfinder mechanism 16 and strobe mechanism 17 using the disk cam 2. The disk cam 2, by the drive of the drive gear 2d, rotates centered on rotation shaft 2e in the direction of the arrow in the drawing or in a direction opposite to the arrow.

The viewfinder comprises objective lens groups 3–5, a reflecting mirror 21, a viewfinder visual field frame 6, a lower panorama visual field frame 22 and an upper panorama visual field frame 23 to respectively cover the top and bottom of the viewfinder visual field frame 6 during panoramic photography, a reflecting mirror 24, a prism 25, and an ocular lens 26. When the photographic picture plane is changed over into a panorama state, the lower panorama visual field frame 22 and upper panorama visual field frame 23, by devices not shown in the drawing, rotate around the shafts 22a and 22b, respectively, in the direction of the respective arrows shown in FIG. 1 and cover a fixed range of the top and bottom of the visual field frame 6, and change over the visual field of the viewfinder image into a panoramic image. In the case of changing over from a panoramic state to a normal state, the reverse of the aforementioned operation is performed. The disk cam 2 is formed such that the cam grooves 2a and 2b cause the viewfinder variable power lens groups 3 and 4 to move back and forth along the guide shafts 8 and 9, and a cam groove 2c causes the strobe 10' to move back and forth along a guide shaft 9.

The strobe 10' moves back and forth along the guide shaft 9, and because it is arranged to freely rotate about the guide shaft 9, the follower pin 10'c ends up inclined with respect to the disk cam 2c, and a rotation stop 10'd is formed in the camera body 41. Due to the contact with the camera body 41, the rotation of the strobe 10 is prevented.

When the guide mechanism of the strobe mechanism 17 (strobe light generating unit) is constituted in this manner, the guide shaft 9 has to be provided separately as one component. Because of this, the guide mechanism of the conventional strobe mechanism 17 has an increased cost and an increased amount of labor is required to manufacture the same. Moreover, it is necessary to form the rotation stop 10'd securing space in order to prevent rotation around the guide shaft 9, and this becomes an obstacle in making the camera smaller.

A portion of a conventional zoom viewfinder mechanism for a camera is shown in FIG. 2. A viewfinder drive disk cam 2 is driven in rotation with a rotation shaft 2e as a center of rotation. A drive gear 2d is formed in the circumferential surface (rear surface) of the disk cam 2, and the drive gear 2d is in engagement with a drive gear 28. Drive gears 26 and 27 rotate drive gear 28, which in turn drives the disk cam 2.

The teeth of the drive gear 2d are radially formed as flat teeth with the rotation shaft 2e of the disk cam 2 as the rotation center and rotation axis 28a of the drive gear 28 is orthogonal to the rotation shaft 2e of the disk cam 2.

In this type of conventional zoom viewfinder mechanism, in order to minimize space, when selecting the drive gears 26–28, it is necessary to select the space by determining, from the speed reduction ratio between the drive gear 28 and the drive gear 2d and the number of teeth of the gears to achieve this speed reduction ratio, the distance between shafts of each gear. This establishes the positions of the drive gears 26–28. At this time, because the engagement positions of the drive gear 28 and the drive gear 2d are decided, the problem is that the number of degrees of freedom in the gear positions becomes small.

Moreover, because it is necessary for the distance between rotation shafts to be fixed, as above, in the case that the diameters of the transmission gears (drive gears 26–28) cannot be large, the number of idle gears increases as well as the cost.

SUMMARY OF THE INVENTION

The present invention takes into account the abovementioned problems and, accordingly, it is an object of the present invention to provide a lens shutter camera including a zoom lens, a strobe as part of a strobe light generating unit, whose radiating angle can be changed by moving a strobe adjustment device, and a guide member which causes the strobe to move and is integrally formed with a separate constituting member of the camera body different from the strobe light generating unit.

It is another object of the present invention to provide a zoom viewfinder mechanism, particularly suitable for use in a lens shutter camera, with shafts of drive gears which transmit rotational force to a disk cam.

It is another object of the present invention to provide a zoom viewfinder mechanism, particularly suitable for use in a lens shutter camera, with a reduced number of drive gears which transmit rotational force to a disk cam.

Additional objects and advantages of the invention will be set forth in part in the description which follows and, in part, will be obvious from the description, or may be learned by practice of the invention.

The foregoing objects of the present invention are achieved by a strobe light generating unit structure which has been fixed in the camera body and a different structural component is made as a movement guide, and there is no necessity to arrange components for exclusive use as guide shafts, such that the cost can be reduced.

Other objects of the present invention are achieved by an apparatus comprising a disk cam to cause a lens group of a viewfinder optical system to move back and forth in a direction of the optical axis according to a difference of the distances in the radial direction from the rotation center to shafts of the individual lenses of the lens group, the shafts fitting in grooves of the disk cam and driving the individual lenses of the lens group to perform variable power of a zoom viewfinder, and drive gears to drive the disk cam. One of the drive gears is a helical gear having a predetermined angle for a lead angle, wherein the rotation center of the disk cam and the rotation axis direction of the one drive gear are positioned so as to intersect.

Because the rotation center of the disk cam and the rotation axis direction of the one drive gear have been positioned such that they intersect, in setting the spacing to bring about intersection, degrees of freedom can be provided in the spacing between the rotation axes of the drive gears which transmit rotation force to the disk cam, resulting in a reduction in the number of drive gears needed.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
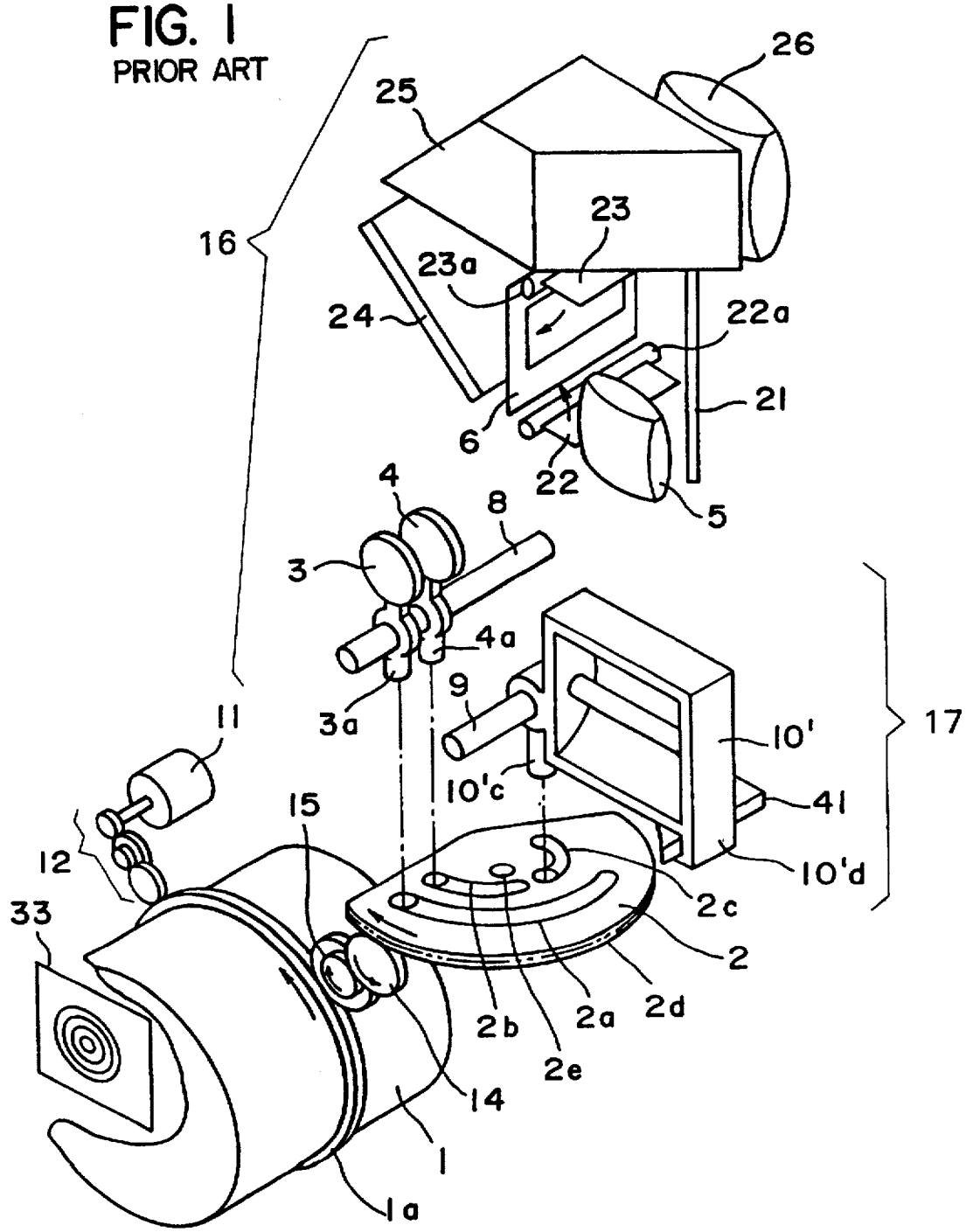
FIG. 1 is a diagram showing a conventional zoom viewfinder mechanism and adjustable strobe light generating unit for a camera.

Reference will now be made in detail to the present preferred embodiments of the present invention, examples of which are illustrated in the accompanying drawings, wherein like reference numerals refer to like elements throughout.

Figure 3:
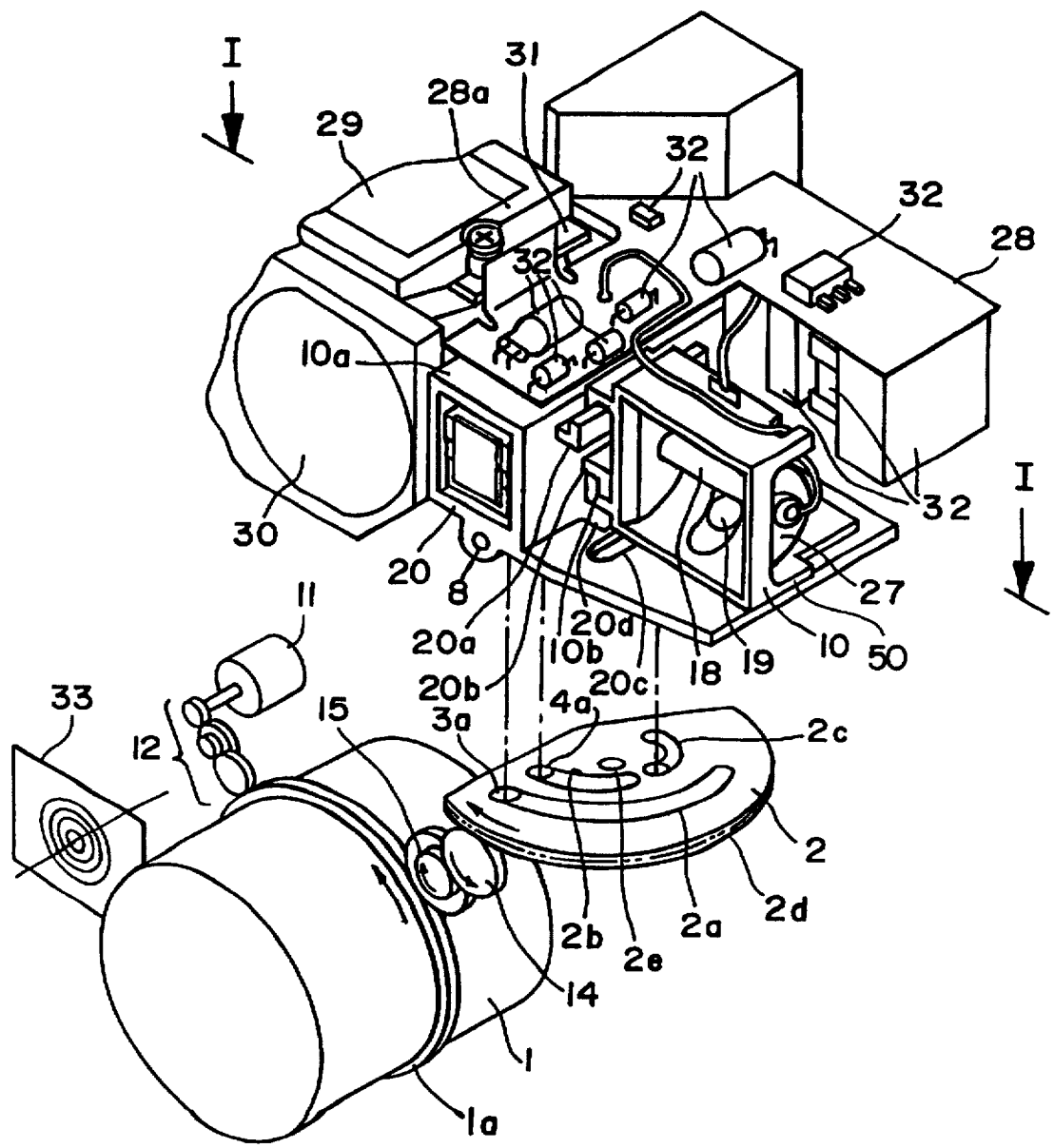
FIG. 3 is a diagram showing a zoom viewfinder mechanism and adjustable strobe light generating unit according to a first embodiment of the present invention.

FIG. 3 shows a first embodiment of the present invention. Drive tube 1 drives a zoom photographic lens optical system (not shown in the drawing) into a tele end (telephoto side end) state, a wide end (wide angle side end) state, or a collapsed state (non-photographic state). A gear 1a is formed on the external circumference of the drive tube 1. A rotational force is applied to the gear 1a from a motor 11 via a gear train 12 and drives the drive tube 1. This rotational force, via drive gears 15 and 14, is transmitted to drive gear 2d of the disk cam 2 which performs the variable power action of viewfinder mechanism 16 and strobe mechanism 50. Namely, the rotational force of the drive tube 1, via the disk cam 2, is used to cause the performance of the variable power action of viewfinder mechanism 16 (shown in FIG. 1), at least a portion of which is in a viewfinder case 20, and strobe mechanism 50. The disk cam 2, through the drive of the drive gear 2d, rotates, centered on the rotation shaft 2e, in the direction shown by the arrow in the drawing (clockwise) or in the reverse direction to the arrow (counterclockwise).

An objective lens group, reflecting mirror, visual field frame, lower panorama visual field frame, upper panorama field of view frame, reflecting mirror, prism, ocular lens are all built similar to the configuration as shown in FIG. 1.

The strobe mechanism 50 includes a reflecting plate 27, light generating tube 18, and a lamp 19 for combined red eye abatement use, light generation and self timer display use, which are supported in reflecting plate support frame 10. At the end of the reflecting plate support frame 10, jaw portions 10a, 10b are formed, arranged to project from the support frame 10. The jaw portions 10a, 10b are coupled to rail grooves 20a, 20b, respectively, formed in the viewfinder case 20, such that the jaw portions 10a and 10b are freely movable in the optical axis direction of the viewfinder objective lens.

Figure 4:
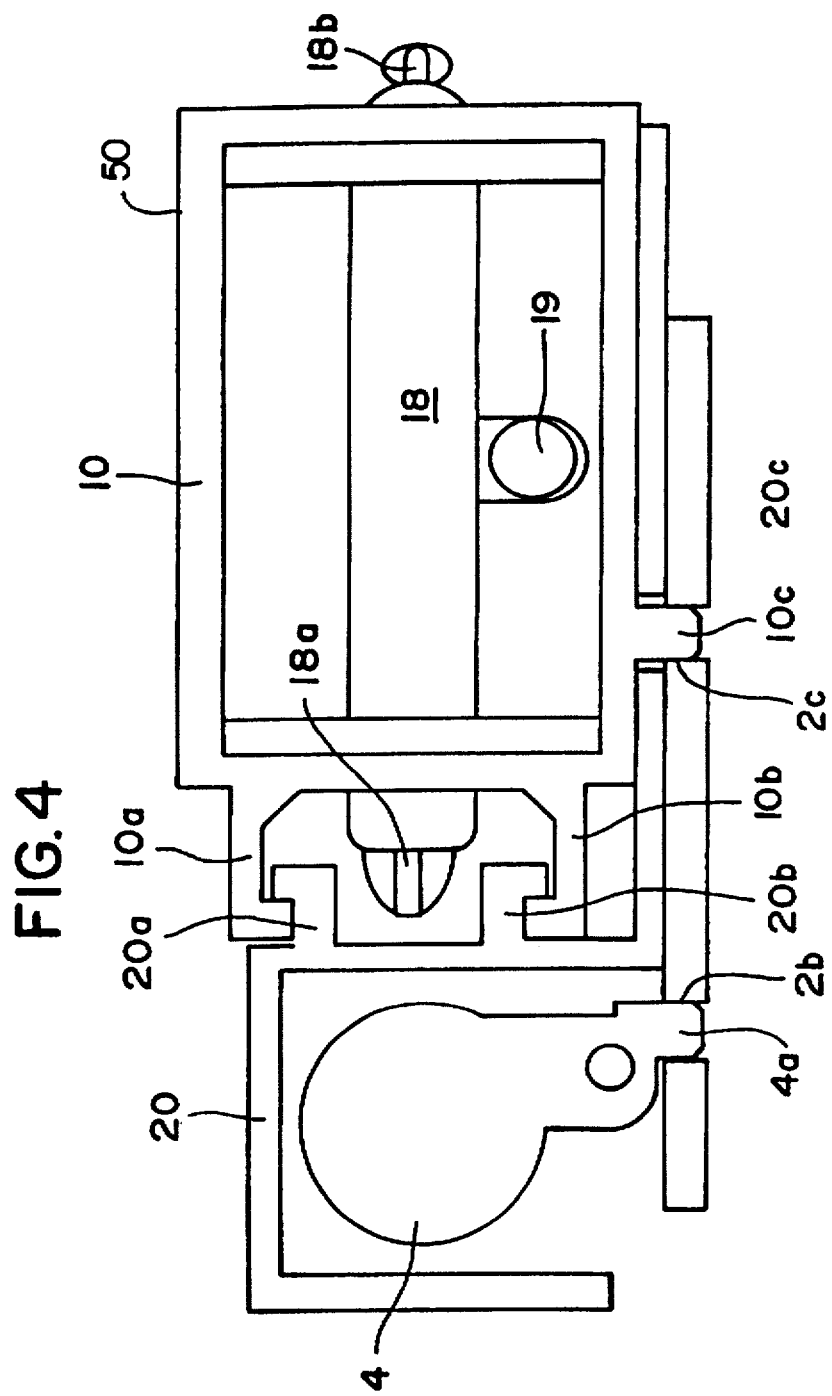
FIG. 4 is a diagram showing a cross-sectional view along line I—I of the adjustable strobe light generating unit of FIG. 3.

A cross section of FIG. 3 along line I—I is shown in FIG. 4. Electrode portions 18a, 18b are on the light generating tube (strobe) 18. The electrode portion 18a of the light generating tube 18 is arranged in the space between the rail grooves 20a and 20b. In this manner, further widening of the strobe light generation unit 50 to the right-hand side in the drawing is prevented. At the bottom surface of reflecting plate support frame 10 of the strobe light generation unit 50, similarly to FIG. 1, a follower pin 10c is formed which penetrates through a viewfinder case aperture 20c, and couples to cam groove 2c of the disk cam 2.

As shown in FIG. 3, electrical circuit component 32 comprises a strobe circuit, and is mounted on a circuit board 28. 20d is a convenient aperture on a molded form in order to form the rail groove 20b. Circuit board 31 is mounted with ICs to perform camera control, autofocus and the like. A solder bridge connects the raised edge 28a of the circuit board 28 with the portion 31. A liquid crystal panel 29 is for display use and a block 30 loaded with a light projection lens is used for performing autofocus and rangefinding.

The action of changing the radiating angle of the strobe, coupled to the zoom action, will be described here. The variable power action of the photographic lens, through the rotation of the motor 11, and via the gear train 12, causes rotation of the drive tube 1, and the disk cam 2 rotates centered on rotation shaft 2e. The viewfinder lens groups 3 and 4 (shown in FIG. 1) are caused to move due to the rotation of this disk cam 2, via cam grooves 2a and 2b. At the same time as this, via cam groove 2c, the coupling of the jaw portions 10a, 10b and rail grooves 20a, 20b act as guides to cause the reflecting plate support frame 10 to move in the optical axis direction. Integral with the reflecting plate support plate 10, the light generating tube 18, which is the strobe, is caused to move in the optical axis direction. By changing distance between a Fresnel lens 33 and the light generating tube 18, the strobe radiating angle is changed according to the photographic imaging angle. In the drawing, the Fresnel lens 33 is drawn at a position distant from the strobe mechanism 50, but in practice, the position is close to the strobe mechanism 50, and closest when the photographic lens is at the wide end, furthest when at the tele end. FIG. 3 shows the wide end state.

With the present invention, because the guide shaft 9 of the convention viewfinder mechanism is done away with, and two guide rail grooves 20a and 20b are used, the prior art rotation stop becomes unnecessary. Thus, space is conserved and a smaller size becomes possible.

Jaw portions 10a and 10b, formed integrally in the strobe reflecting plate support frame 10, are coupled in the two rail grooves 20a and 20b formed toward the top and bottom in the viewfinder case 20. Because of this, a change in the direction of gravity does not result in large shaking about the direction in which the rail grooves 20a and 20b extend. Further, the jaw portions 10a and 10b have a fixed length in the direction in which the rail grooves 20a and 20b extend. Because of this, even in the case that there is hardly any clearance between the rail grooves 20a and 20b and the jaw portions 10a and 10b, by the rotation of the cam disk 2, the strobe mechanism 50 can be moved smoothly and without any large inclination action of a rotary component in the direction perpendicular to the direction in which the rail grooves 20a and 20b extend.

In the camera of the first embodiment, when changing the radiating angle of the light generating tube 18, the moving of the strobe mechanism 50 accompanies the zoom action of a photographic lens. The guide shaft 9 of the first type of conventional camera, arranged exclusively in order to cause the strobe mechanism 50 to move, is no longer necessary and a reduction of cost is accomplished.

Also, due to the fact that movement guide portions have been formed by plural coupling portions, shaking in the direction in which the guides extend are suppressed even if there is a change in the direction of gravity cause by a movement of the camera.

Figure 5:
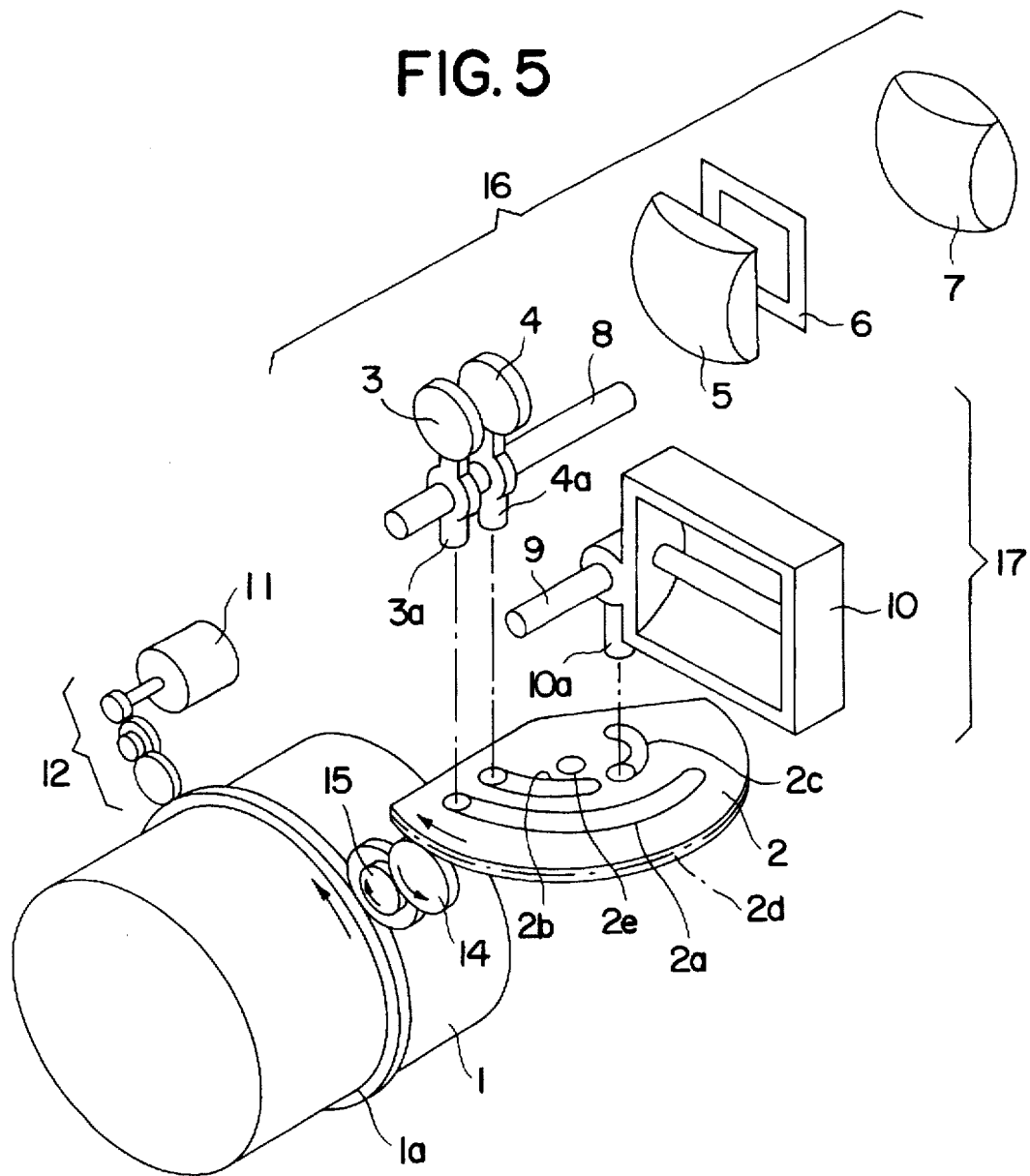
FIG. 5 is an oblique view showing a zoom viewfinder mechanism and adjustable strobe light generating unit according to a second embodiment of the present invention.
Figure 6:
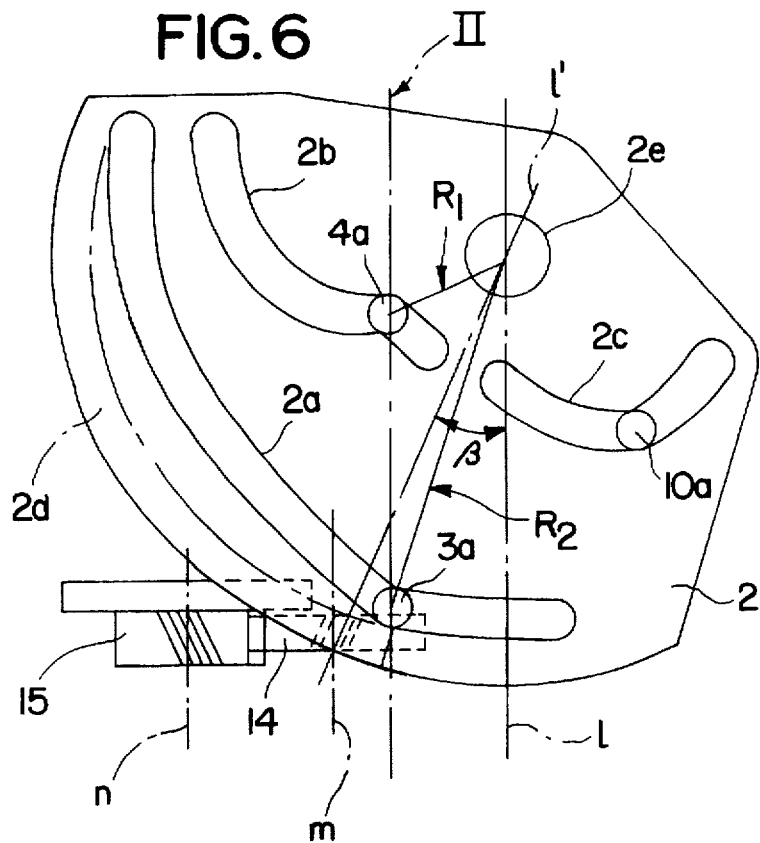
FIG. 6 is a plan view showing a disk cam and drive gears of the zoom viewfinder mechanism shown in FIG. 5 in a state where a zoom photographic lens optical system has been moved to a wide end (wide angle position).
Figure 7:
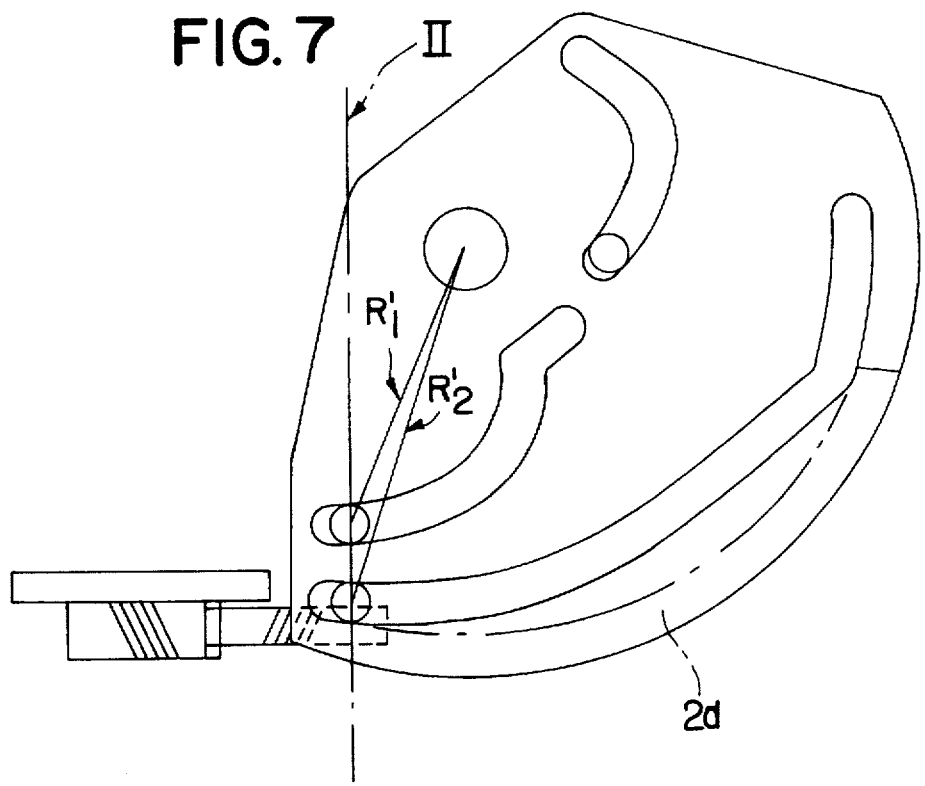
FIG. 7 is a plan view showing a disk cam and drive gear of the zoom viewfinder mechanism shown in FIG. 5 in a state where a zoom photographic lens optical system has been moved to a tele end (telephoto position).
Figure 8:
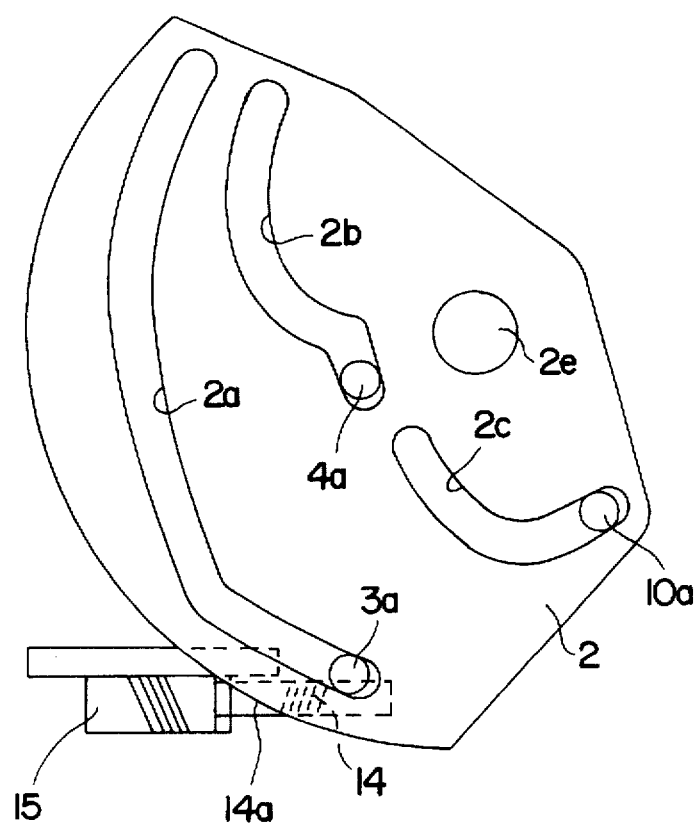
FIG. 8 is a plan view showing a disk cam and drive gears of the zoom viewfinder mechanism shown in FIG. 5 in a state where a zoom photographic lens optical system has been moved to a collapsed state.

FIG. 5 is an oblique view showing a second embodiment of a zoom viewfinder mechanism according to the present invention. FIGS. 6–8 are plan views showing a disk cam and drive gears of the zoom viewfinder mechanism shown in FIG. 5, where a zoom photographic lens optical system of a camera containing the zoom viewfinder mechanism is in various positions.

In FIG. 5, a drive tube 1 drives a zoom photographic lens system, not shown in the drawing, to a tele end (telephoto position) state, a wide end (wide angle position) state, or a collapsed lens state. FIG. 6 shows the state of the zoom viewfinder when the zoom photographic lens optical system has been moved to the wide end (wide angle position), FIG. 7 shows the state of the zoom viewfinder when the zoom photographic lens optical system has been moved to the tele end (telephoto position), and FIG. 8 shows the state of the zoom viewfinder when the zoom photographic lens optical system has been moved to the collapsed state when the camera is not in use.

A gear 1a is formed on the external circumference of the drive tube 1. A rotation force is provided to the gear 1a by a motor 11 and gear train 12. The rotational force is transmitted via drive gears 15 and 14 to a drive gear 2d of a disk cam 2. Namely, the rotational force of the drive tube 1 is used to bring about a variable power operation of a viewfinder mechanism 16 and a strobe mechanism 17 through the disk cam 2.

The disk cam 2 rotates with rotation shaft 2e as a rotation center. In the disk cam 2, cam grooves 2a and 2b cause the viewfinder variable power lens groups 3 and 4 to move back and forth along a guide shaft 8, and a cam groove 2c causes a strobe light source 10 to move back and forth along a guide shaft 9.

Objective lens group 5, along with the viewfinder variable power lens groups 3 and 4, comprise the viewfinder objective lens group of the viewfinder mechanism 16. In particular, lens groups 3–4 comprise a variable power lens group to change the magnification of the viewfinder mechanism. A visual field frame 6 is on the primary imaging surface due to the lens groups 3–5. An eyepiece lens group 7 is also provided.

Figure 2:
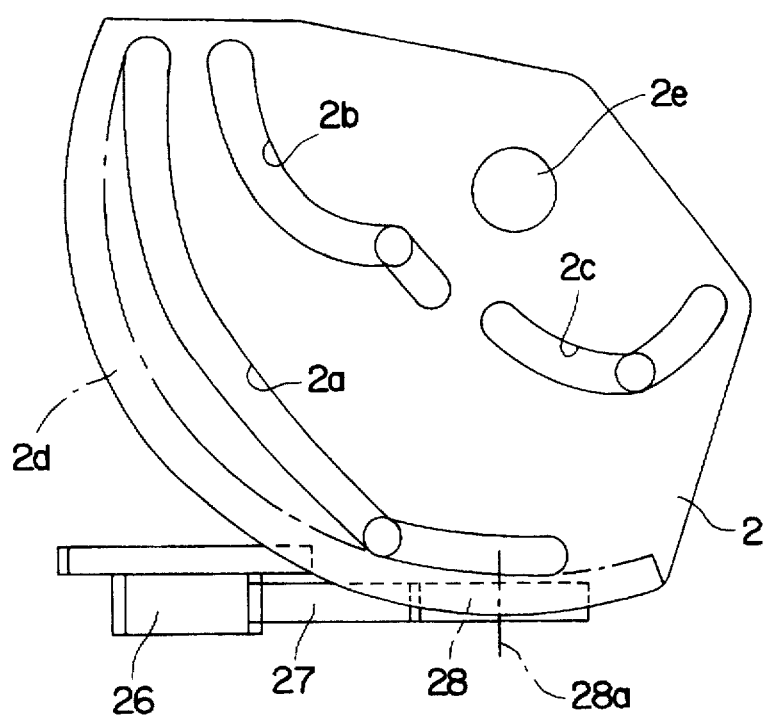
FIG. 2 is a plan view showing a portion of a conventional zoom viewfinder mechanism for a camera.

FIG. 6 is a plan view showing the relationship of the viewfinder drive disk cam 2 in the state in which the zoom photographic lens optical system has been moved to the wide end (wide angle position). Taking the line joining the center of engagement of the prior art drive gear 28 (shown in FIG. 2) and the rotation center (rotation shaft 2e) of the disk cam 2 as L, and the line joining the center of engagement of the drive gear 14 and the rotation center (rotation shaft 2e) of the disk cam 2 as L', the angle formed by line L and line L' is denoted as β. The drive gear 14 comprises a helical gear of lead angle β. The rotation center of the drive gear 14 is m, and the rotation center of the drive gear 15 is n.

In this manner, the rotation center 2e of the disk cam 2 and the rotation axis direction of the drive gear 14 have been positioned such that they intersect. When selecting gears to obtain the reduction ratio between gear 1a and drive gear 2d, because there is no limitation of the distance between the axes of gear 15 and gear 14, gear engagement can be selected in the necessary space. Thus, the degrees of freedom of setting the drive gears are increased. Furthermore, in comparison with the prior art, it becomes possible to reduce the number of drive gears. In this manner, it becomes possible to provide reductions in both size and cost.

In FIG. 6, guide shaft 8 is shown by the line I. The distance from the rotation center of the disk cam 2 to the center of the shaft 4a of viewfinder variable lens group 4 is $R_1$ and the distance from the rotation center to the center of shaft 3a of the viewfinder variable lens group 3 is $R_2$. As the zoom photographic lens moves from a wide end (FIG. 6) to a tele end (FIG. 7), the distance of shaft 4a from the rotation center becomes $R_1'$ and the distance of the shaft 3a from the rotation center becomes $R_2'$. The movement of the viewfinder variable lens groups 3, 4 causes an adjustment in the variable power of the zoom viewfinder mechanism.

Because the rotation center of the disk cam and the rotation shaft direction of the drive gear 14 are positioned such as to intersect, by setting the spacing which causes intersection, degrees of freedom can be provided in the distance between rotation axes of the drive gears transmitting a rotation force to the disk cam, and it becomes possible to reduce the number of drive gears. Further, the zoomfinder mechanism shown in FIGS. 6–8 may also be used in the first embodiment shown in FIG. 3.

Although the preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A zoom viewfinder mechanism in a device having an optical axis, said zoom viewfinder mechanism comprising:
   a lens group to view a subject;
   a disk cam, connected to said lens group and rotatable about an axis of rotation, to move said lens group parallel to the optical axis by rotating about the rotation center, to adjust a variable power of said zoom viewfinder mechanism; and
   drive gears to drive said disk cam;
   wherein one of said drive gears engages said disk cam and is a helical gear having a predetermined lead angle.

2. The zoom viewfinder mechanism as claimed in claim 1, wherein:
   said disk cam further comprises grooves; and
   said lens group further comprises lenses having shafts which fit in respective ones of said grooves, the variable power of said viewfinder mechanism dependent upon differences in distances of the shafts from the rotation center.

3. A zoom viewfinder mechanism in a device having an optical axis, said zoom viewfinder mechanism comprising:
   a lens group to view a subject;
   a disk cam, connected to said lens group and rotatable about a rotation center, to move said lens group parallel to the optical axis by rotating about the axis of rotation to adjust a variable power of said zoom viewfinder mechanism, said disk cam having a disk cam gear extending along at least a portion of a side of said disk cam; and
   a plurality of drive gears having respective rotation shafts, one of said plurality of drive gears engaging the disk cam gear to drive said disk cam;
   wherein said one of said plurality of drive gears engages said disk cam gear and is a helical gear having a first predetermined lead angle.

4. The zoom viewfinder mechanism as claimed in claim 3, wherein a second one of said plurality of drive gear engages said one of said plurality of drive gears and is a helical gear having a second predetermined lead angle.

5. A camera having a camera body, comprising:
   a zoom lens;
   a strobe light generating unit, movable relative to the camera body and having a radiating angle;
   a disk cam, connected to said zoom lens through drive gears and to said light generating unit and rotatable about a rotation center, to move said strobe light generating unit in response to movement by said zoom lens;
   a movement guide unit integrally formed in the camera body, to guide said strobe light generating unit; and
   a viewfinder case formed on the camera body, wherein said movement guide unit is integrally molded with said viewfinder case.

6. The camera as claimed in claim 5, wherein:
   said movement guide unit comprises first and second protuberances which form respective grooves in the direction of the optical axis; and
   said strobe light generating unit comprises first and second jaw portions which respectively fit within said respective grooves, to guide said strobe light generating unit in the direction of the optical axis.

7. The camera as claimed in claim 5, wherein said movement guide unit contacts said strobe light generating unit at two distinct and spaced apart locations at a same side of said strobe light generating unit, to guide said strobe light generating unit in an optical axis direction of the zoom lens.

8. The camera as claimed in claim 5, wherein said movement guide unit has a narrower dimension in a given direction perpendicular to the optical axis and a front surface of said strobe light generating unit than a height dimension of said strobe light generating unit in said given direction.

9. The camera as claimed in claim 8, wherein:
   said movement guide unit comprises first and second protuberances which form respective grooves in the direction of the optical axis; and
   said strobe light generating unit comprises first and second jaw portions which respectively fit within said respective grooves, to guide said strobe light generating unit in the direction of the optical axis.

10. The camera as claimed in claim 5, further comprising:
    a zoom viewfinder mechanism, comprising:
       a lens group to view a subject, wherein said disk cam is connected to said lens group and rotatable about the axis of rotation, to move said lens group parallel to the optical axis by rotating about the rotation center, to adjust a variable power of said zoom viewfinder mechanism;
       wherein one of said drive gears engages said disk cam and is a helical gear having a predetermined lead angle.

11. The camera as claimed in claim 10, wherein:
    said disk cam further comprises cam grooves; and
    said lens group further comprises lenses having shafts which fit in respective ones of said cam grooves, the variable power of said viewfinder mechanism dependent upon differences in distances of the shafts from the rotation center.

12. A camera having a camera body, comprising:
    a zoom lens;
    a strobe light generating unit, movable relative to the camera body and including a strobe having a radiating angle;
    a strobe radiation angle change device for moving said strobe light generating unit in response to movement by said zoom lens; and
    a movement guide unit integrally formed in the camera body, to guide said strobe light generating unit; and
    wherein
       said movement guide unit has a narrower dimension in a given direction perpendicular to the optical axis and a front surface of said strobe light generating unit than a height dimension of said strobe light generating unit in said given direction,
       said movement guide unit comprises first and second protuberances which form respective grooves in the direction of the optical axis; and
       said strobe light generating unit comprises first and second jaw portions which respectively fit within said respective grooves, to guide said strobe light generating unit in the direction of the optical axis, and
       said first and second protuberances are spaced apart by a space extending in the direction of the optical axis and one end of said strobe moves within the space between said first and second protuberances when said strobe light generating unit is moved in the direction of the optical axis.

13. A zoom viewfinder mechanism in a device having an optical axis, said zoom viewfinder mechanism comprising:

a lens group to view a subject;

a disk cam, connected to said lens group and rotatable about an axis of rotation, to move said lens group parallel to the optical axis by rotating about the rotation center, to adjust a variable power of said zoom viewfinder mechanism; and drive gears to drive said disk cam;

wherein one of said drive gears engages said disk cam and is a helical gear having a predetermined lead angle, and a rotation center of said one gear is not parallel to a center of engagement of said one drive gear with said disk cam.

14. A zoom viewfinder mechanism in a device having an optical axis, said zoom viewfinder mechanism comprising:

a lens group to view a subject;

a disk cam, connected to said lens group and rotatable about a rotation center, to move said lens group parallel to the optical axis by rotating about the axis of rotation to adjust a variable power of said zoom viewfinder mechanism, said disk cam having a disk cam gear extending along at least a portion of a side of said disk cam; and a plurality of drive gears having respective rotation shafts, one of said plurality of drive gears engaging the disk cam gear to drive said disk cam;

wherein said one of said plurality of drive gears engages said disk cam gear and is a helical gear having a first predetermined lead angle, and a rotation center of said one gear is not parallel to a center of engagement of said one drive gear with said disk cam.

15. A zoom viewfinder mechanism in a device having an optical axis, said zoom viewfinder mechanism comprising:

a lens group to view a subject;

a disk cam, connected to said lens group and rotatable about an axis of rotation, to move said lens group parallel to the optical axis by rotating about the rotation center, to adjust a variable power of said zoom viewfinder mechanism; and drive gears to drive said disk cam;

wherein one of said drive gears engages said disk cam and is a helical gear having a predetermined lead angle, and a tangent of said disk cam at the engagement position with said one drive gear is oblique to an axis of rotation of said one drive gear.

16. A zoom viewfinder mechanism in a device having an optical axis, said zoom viewfinder mechanism comprising:

a lens group to view a subject;

a disk cam, connected to said lens group and rotatable about a rotation center, to move said lens group parallel to the optical axis by rotating about the axis of rotation to adjust a variable power of said zoom viewfinder mechanism, said disk cam having a disk cam gear extending along at least a portion of a side of said disk cam; and a plurality of drive gears having respective rotation shafts, one of said plurality of drive gears engaging the disk cam gear to drive said disk cam;

wherein said one of said plurality of drive gears engages said disk cam gear and is a helical gear having a first predetermined lead angle, and a tangent of said disk cam at the engagement position with said one drive gear is oblique to an axis of rotation of said one drive gear.

* * * * *